US006451076B1

(12) United States Patent
Nevoret et al.

(10) Patent No.: US 6,451,076 B1
(45) Date of Patent: Sep. 17, 2002

(54) ENGINEERED ABRASIVES

(75) Inventors: Damien Nevoret, Amherst, NY (US); Marc Pehkonen, Buffalo, NY (US); Paul Wei, Latham, NY (US); Gwo Shin Swei, East Amherst, NY (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 09/886,847

(22) Filed: Jun. 21, 2001

(51) Int. Cl.[7] ................................................. B24D 3/34
(52) U.S. Cl. ............................. 51/298; 51/295; 51/307; 51/309
(58) Field of Search .......................... 51/295, 298, 307, 51/309, 308, 297

(56) References Cited

U.S. PATENT DOCUMENTS

| 5,549,962 A | * | 8/1996 | Holmes et al. ................ 51/298 |
| 5,833,724 A | * | 11/1998 | Wei et al. ...................... 51/307 |
| 5,863,306 A | * | 1/1999 | Wei et al. ...................... 51/295 |

* cited by examiner

*Primary Examiner*—Michael Marcheschi
(74) *Attorney, Agent, or Firm*—David Bennett

(57) ABSTRACT

Coated abrasives suitable for very fine abrading applications can be obtained by depositing a layer of a formulation comprising abrasive grits, fillers, grinding aid, additives and a binder resin on a substrate in the form of a structured abrasive, adhering to the surface of the structured abrasive a functional powder; and then applying a top size coat over the functional powder.

10 Claims, 4 Drawing Sheets

ENGINEERED ABRASIVES

BACKGROUND OF THE INVENTION

Figure 1:
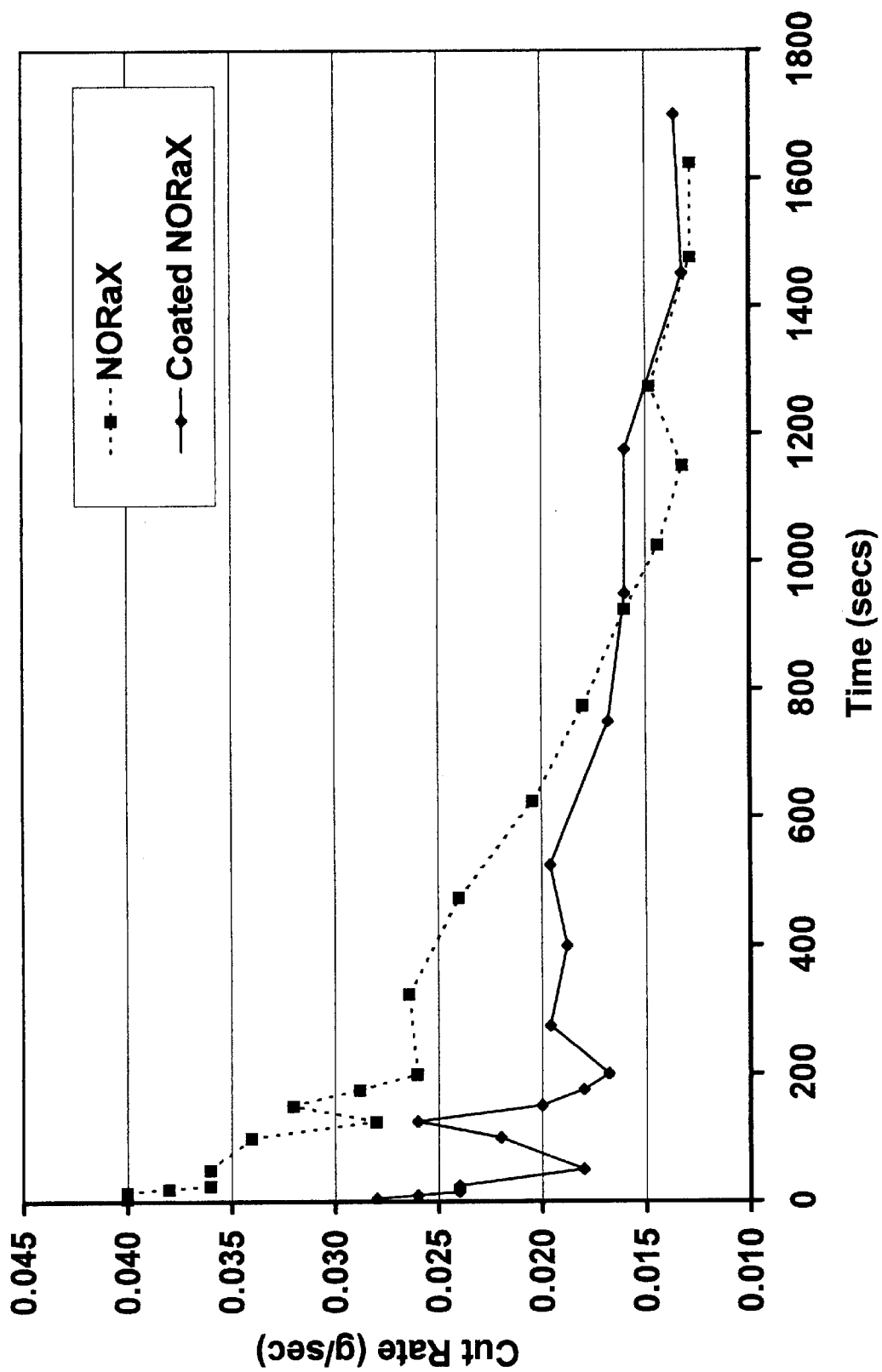

This invention relates to the production of engineered abrasives on substrates in a form useful for grinding and finishing of substrates such as metals, wood, plastics and glass The proposal to deposit generally isolated structures such as islands or ridges of a mixture of a binder and abrasive material on a backing material to form so-called "engineered abrasives", has been known for many years. If the islands or ridges have very similar heights above the backing and are adequately separated then, (perhaps after a minor dressing operation), use of the product will result in reduced surface scratching and improved surface smoothness. In addition the spaces between the islands provide a route by which swarf generated by the abrasion can be dispersed from the work area and coolant can circulate.

In a conventional coated abrasive, investigation of the grinding surface reveals that a comparatively small number of the surface abrasive grits in an active abrading zone are in contact with the workpiece at the same time. As the surface wears, this number increases but equally the utility of some of those abrasive grits may be reduced by dulling. The use of structured abrasives has the advantage that the uniform islands wear at essentially the same rate such that a uniform rate of abrasion can be maintained for longer periods. In a sense the abrading work is more evenly shared among a larger number of grinding points. Moreover since the islands comprise many smaller particles of abrasive, erosion of an island uncovers new, unused abrasive particles which are as yet undulled.

One technique for forming such an array of isolated islands or dots that has been described is that of the rotogravure printing. The technique of rotogravure printing employs a roll into the surface of which a pattern of cells has been engraved. The cells are filled with abrasive/binder formulation and the roll is pressed against a surface and the formulation in the cells is transferred to the surface.

Chasman et al. in U.S. Pat No. 4,773,920 disclosed that using a rotogravure coater, it is possible to apply a uniform pattern of ridges and valleys to the binder formulation which, when cured, can serve as channels for the removal of lubricant and swarf. However beyond the bare statement of possibility, no details are given that might teach how this might be carried out.

In U.S. Pat No. 4,644,703 Kaczmarek et al. used a rotogravure roll in a more conventional fashion to deposit an abrasive/binder formulation to deposit a layer that is then smoothed out before a second layer is deposited by a rotogravure process on top of the smoothed-out first layer. There is no teaching of the nature of the final cured surface.

In U.S. Pat No. 5,014,468 (Ravipati et al.) it was proposed to use an abrasive/binder mixture having non-Newtonian flow properties and to deposit this mixture by a rotogravure technique on to a film. In this process the mixture was deposited from the edges of the rotogravure cells to produce a unique structures with deposits of reducing thickness with distance away from the surface surrounding areas devoid of the mixture. If the cells are sufficiently close together, the surface structures can appear interlinked. This product has proved very useful, particularly in ophthalmic fining operations. A further refinement of such a rotogravure process was described in U.S. Pat No. 5,840,088. The process is very useful but it has a potential problem with increasing build-up of material in the cells of the rotogravure roll such that the deposition pattern can change slightly during a protracted production run. In addition the nature of the process is such that it is limited to formulations containing relatively fine abrasive grits, (usually less than 20 microns).

Another approach to making engineered abrasives is provided by depositing an abrasive/binder mixture on a substrate surface and then imposing a pattern comprising an array of isolated structures on the mixture by curing the binder while in contact with a mold having the inverse of the desired patterned surface. This approach is described in U.S. Pat Nos. 5,437,754; 5,378,251; 5,304,223 and 5,152,917. There are several variations on this theme but all have the common feature that each structure in the pattern is set by curing the binder while the composite is in contact with a molding surface.

In U.S. Pat No. 5,863,306 Wei et al. described another technique for making engineered abrasives by an embossing process applied to an abrasive /curable binder mixture.

U.S. Pat No. 5,833,724 (Wei et al.) refined engineered abrasive structures, deposited by any prior art technique, by the superposition of a "functional powder" over the engineered surface. This functional powder can be abrasive particles or a grinding aid or any other additive conveying a specific advantageous property on the engineered abrasive surface. Most often the powder is a mixture of abrasive particles and a grinding aid. Such a functional powder provides a very aggressive initial cut that is highly desirable.

The present invention provides an added improvement to this concept that ensures maximum benefit from the functional powder coating.

GENERAL DESCRIPTION OF THE INVENTION

It has now been found that a coated abrasive can be made wherein the surface is engineered to comprise a plurality of shaped composites attached to a common backing material, said composites comprising a UV-cured resin with abrasive particles dispersed therein, and the surface of the shaped abrasive composites having a layer of particles of a functional powder adhered thereto characterized in that a top size coat overlies the functional powder particles.

The "top size coat" is a layer comprising a cured binder which is deposited over the functional powder and acts to help retain the particles of powder in position during grinding. As the name indicates it is the topmost layer of the coated abrasive and is therefore the layer that first contacts a workpiece when the coated abrasive is in use. The top size coat can comprise other non-abrasive components such as a filler or a pigment to modify the physical properties and/or appearance of the surface. The binder can be a thermosetting resin or a radiation curable resin. Examples of such resins include phenol/formaldehyde resins; urea/formaldehyde resins; epoxy resins; (metharylate polymers and copolymers; urethane (meth)acrylate resins; polyester/(meth)acrylate resins; epoxy-meth)acrylate resins and other resins known in the art for such applications.

It is preferable that the top size layer is compatible with the layer over which it is applied. This is preferred to ensure that the cured top size layer will not flake off the layer immediately below under grinding conditions. For example composites in which the cured binder is an acrylate-based radiation-cured binder can be over laid by a top layer that is also an acrylate resin, an epoxy resin or a phenolic resin.

The invention is particularly useful when the engineered abrasive surface comprises a coating of a functional powder, separately applied and bonded to the surface or applied to the UV-curable binder/abrasive mixture from which the composites are formed before cure of the binder such that the powder is concentrated in the surface layer of the composites as taught in U.S. Pat No. 5,833,724.

In the present application the term "functional powder" is used to refer to finely divided material that modifies the abrasive qualities of the engineered abrasives to which it is applied. This can be as simple as making the engineered abrasive cut more aggressively or reducing the buildup of swarf or static charge on the surface. Some functional powders can additionally serve as a releasing agent or a barrier between the resin formulation and the embossing tool, reducing sticking problems and allowing improved release. Included under the heading of "functional powders" are fine abrasive grits, grinding aids, anti-static additives, lubricant powders and the like. The individual particles of the powder typically have an average particle size, ($D_{50}$), less than about 250 micrometers such as from 1 to 150 micrometers and more preferably from 10 to 100 micrometers.

DRAWINGS

FIG. 1 is a graph showing the variation of cut rate with time in the comparative evaluations in Example 1.

Figure 2:
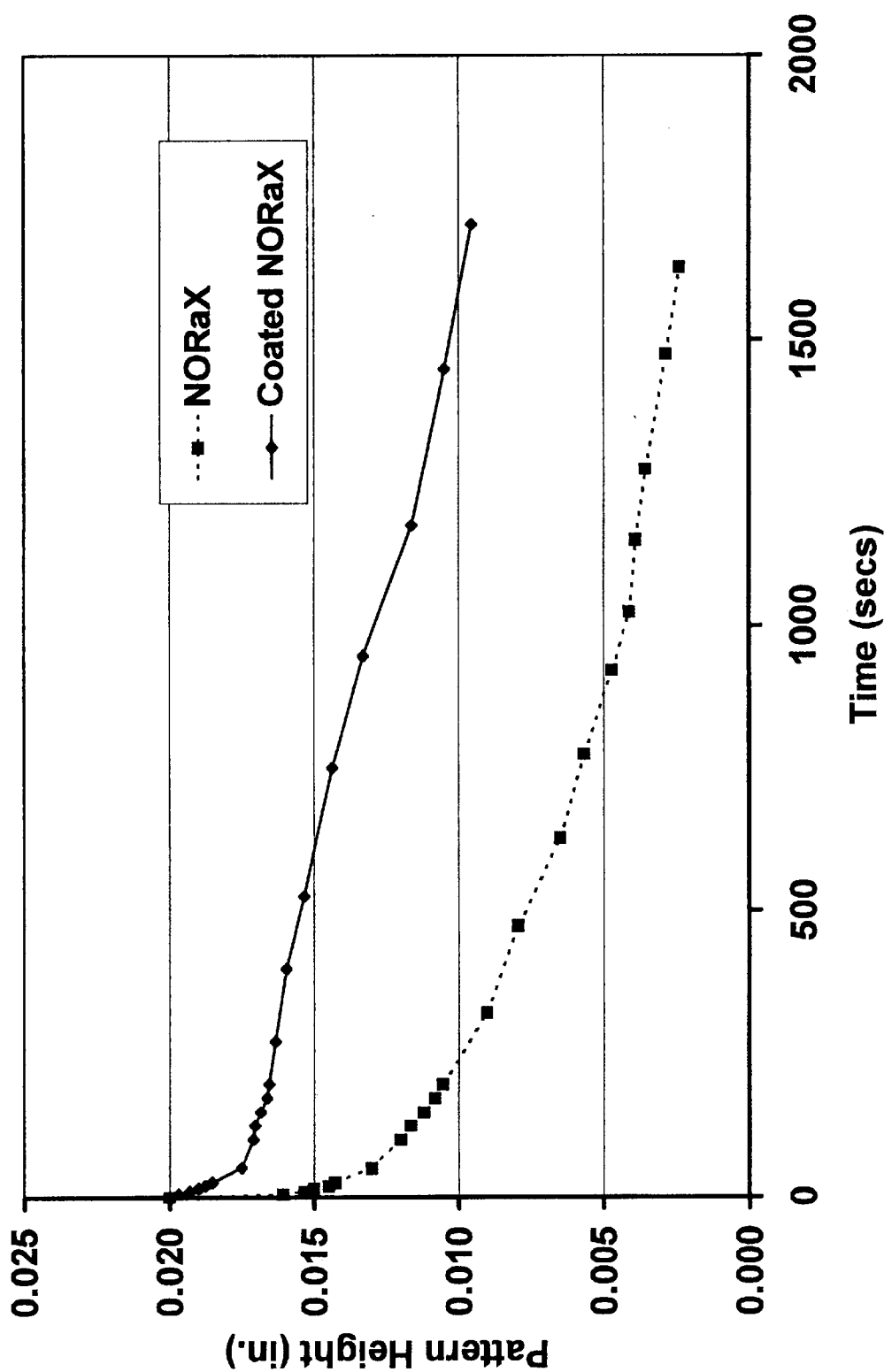
Figure 3:
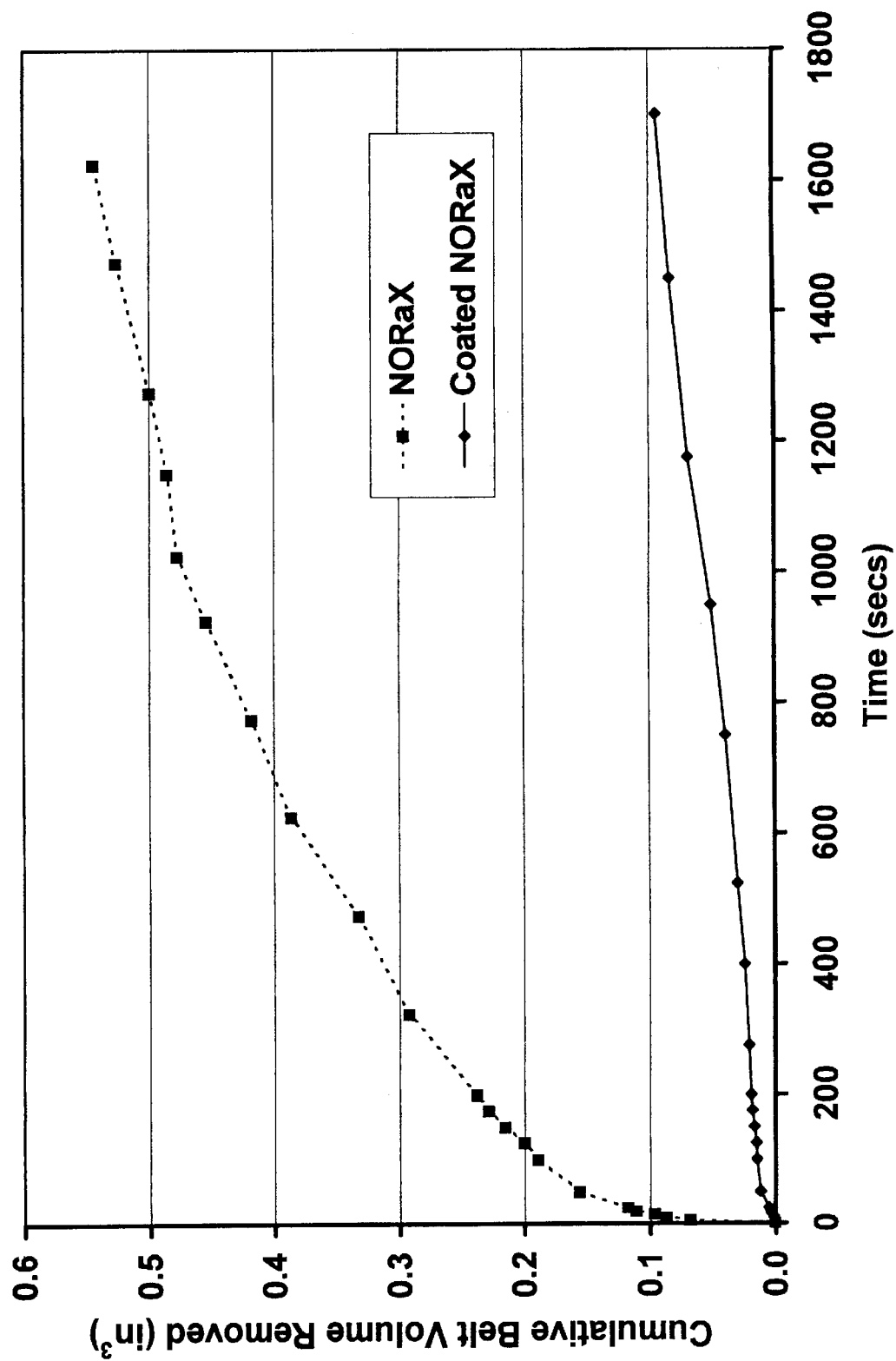

FIGS. 2 and 3 also refer to the data generated in the same Example and compare variations of pattern height with time, (FIG. 2), and cumulative abrasive volume loss with time, (FIG. 3).

Figure 4:
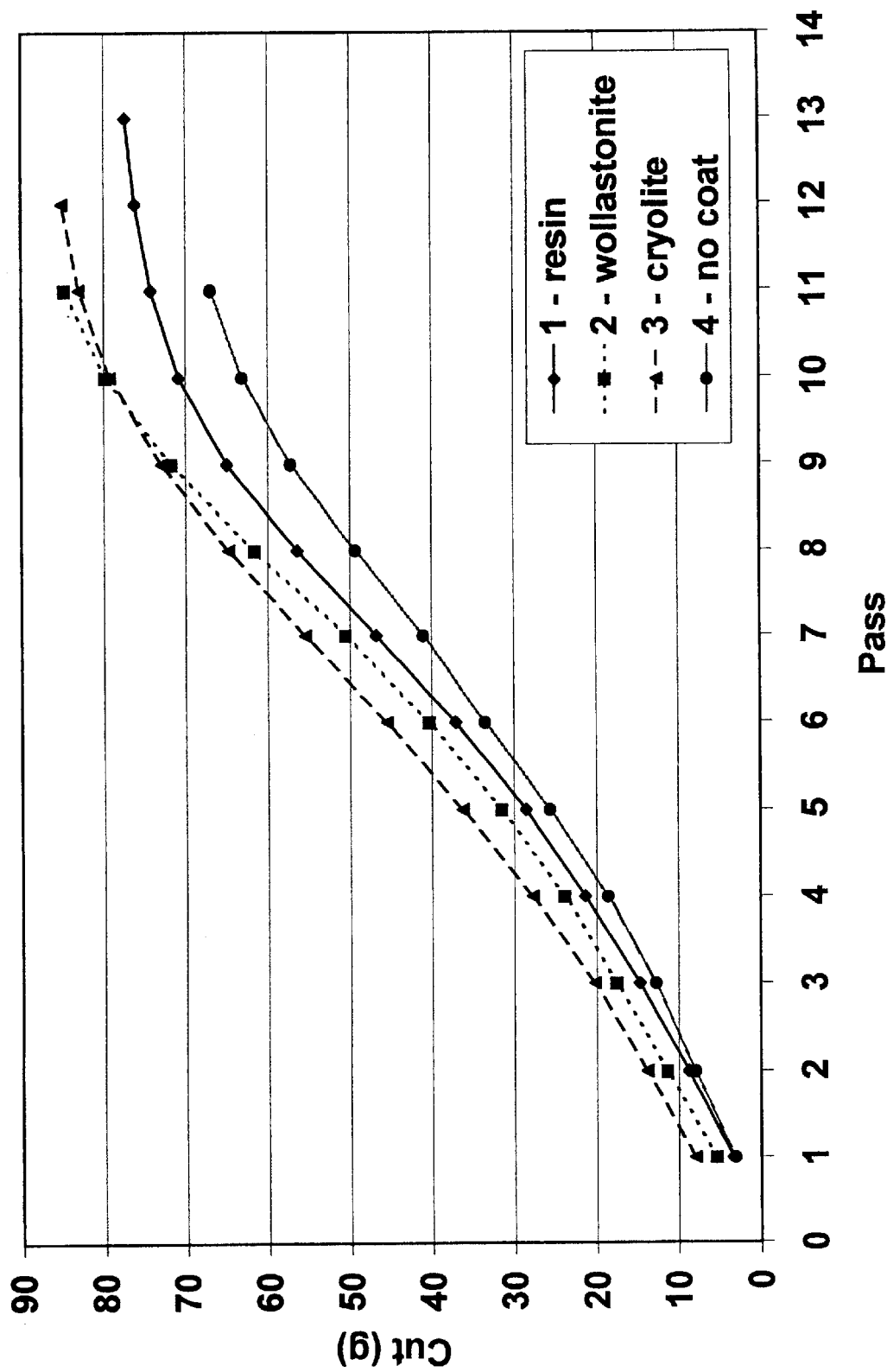

FIG. 4 refers to the Example 2 data and is a graph of cut rate against number of passes for different top size coat formulations.

DETAILED DESCRIPTION OF THE INVENTION

The formation of the engineered abrasive surface can be by any of those techniques known in the art in which a slurry composite of abrasive and a binder precursor is cured while in contact with a backing and a production tool so as to be adhered on one surface to the backing and, to have imposed on the other surface the precise shape of the inside surface of the production tool. Such a process is described for example in U.S. Pat Nos. 5,152,917; 5,304,223; 5,378,251; and 5,437,254 all of which are incorporated herein by reference. Alternative formation methods, including rotogravure coating, are described in U.S. Pat Nos. 5,014,468 and 4,773,920 and these too are incorporated by reference in this Application.

The surface of the engineered abrasive can have any desired pattern and this is determined in large part by the intended purpose of the coated abrasive product. It is for example possible to provide that the surface is formed with alternating ridges and valleys oriented in any desired direction. Alternatively the surface may be provided with a plurality of projecting composite shapes which may be separated or interconnected and either identical or different from adjacent shapes. Most typically the surface of the engineered abrasives have substantially identical shapes, or groups of repeating shapes, in predetermined patterns across the surface of the coated abrasive. Such shapes may be in the form of pyramids with square or triangular bases or they may have more rounded shapes without clear edges where adjacent planes meet. The rounded shapes may be circular in cross-section or be elongated depending on the conditions of deposition and the intended use. The regularity of the shapes depends to some extent on the intended application. More closely spaced shapes, for example more than about 1000 per square centimeter, are favored for fine finishing or polishing while more aggressive cutting is favored by more widely spaced shapes.

The abrasive component of the formulation can be any of the available materials known in the art such as alpha alumina, (fused or sintered ceramic), silicon carbide, fused alumina/zirconia, cubic boron nitride, diamond and the like as well as the combination of thereof. Abrasive particles useful in the invention typically and preferably have an average particle size from 1 to 150 micron, and more preferably from 1 to 80 micron. In general however the amount of abrasive present provides from about 10 to about 90%, and preferably from about 30 to about 80%, of the weight of the formulation.

The other major component of the formulation is the binder. This is a curable resin formulation selected from radiation curable resins, such as those curable using electron beam, UV radiation or visible light, such as acrylated oligomers of acrylated epoxy resins, acrylated urethanes and polyester acrylates and acrylated monomers including monoacrylated and/or multiacrylated monomers. Indeed it is often convenient to have a radiation curable component present in the formulation that can be cured relatively quickly after the formulation has been deposited so as to add to the stability of the deposited shape. In the context of this application it is understood that the term "radiation curable" embraces the use of visible light, ultraviolet (UV) light and electron beam radiation as the agent bringing about the cure. In some cases the thermal cure functions and the radiation cure functions can be provided by different functionalities in the same molecule. This is often a desirable expedient.

The resin binder formulation can also comprise a non-reactive thermoplastic resin which can enhance the self-sharpening characteristics of the deposited abrasive composites by enhancing the erodability. Examples of such thermoplastic resin include polypropylene glycol, polyethylene glycol, and polyoxypropylene-polyoxyethylene block copolymer, etc.

Fillers can be incorporated into the abrasive slurry formulation to modify the rheology of formulation and the hardness and toughness of the cured binders. Examples of useful fillers include: metal carbonates such as calcium carbonate, sodium carbonate; silicas such as quartz, glass beads, glass bubbles; silicates such as talc, clays, calcium metasilicate; metal sulfate such as barium sulfate, calcium sulfate, aluminum sulfate; metal oxides such as calcium oxide, aluminum oxide; and aluminum trihydrate.

The abrasive slurry formulation from which the structured abrasive is formed can also comprise a grinding aid to increase the grinding efficiency and cut rate. Useful grinding aids can be inorganic based, such as halide salts, for example sodium cryolite, potassium tetrafluoroborate, etc.; or organic based, such as chlorinated waxes, for example polyvinyl chloride. The preferred grinding aids in this formulation are cryolite and potassium tetrafluoroborate with particle size ranging from 1 to 80 micron, and most preferably from 5 to 30 micron. The weight percent of grinding aid ranges from 0 to 50%, and most preferably from 10–30%.

The abrasive/binder slurry formulations used in the practice of this invention may further comprise additives including: coupling agents, such as silane coupling agents, for example A-174 and A-1100 available from Osi Specialties, Inc., organotitanates and zircoaluminates; anti-static agents, such as graphite, carbon black, and the like; suspending agents, viscosity modifiers such as fumed silica, for example Cab-O-Sil M5, Aerosil 200; anti-loading agents, such as zinc stearate; lubricants such as wax; wetting agents; dyes; fillers; viscosity modifiers; dispersants; and defoamers.

Depending on the application, the functional powder deposited on the slurry surface can impart unique grinding characteristics to the abrasive products. Examples of functional powders include: 1) abrasive grains—all types and grit sizes; 2) fillers— calcium carbonate, clay, silica, wollastonite, aluminum trihydrate, etc.; 3) grinding aids—$KBF_4$, cryolite, halide salt, halogenated hydrocarbons, etc.; 4) anti-loading agents—zinc stearate, calcium stearate, etc., 5) anti-static agents—carbon black, graphite, etc., 6) lubricants—waxes, PTFE powder, polyethylene glycol, polypropylene glycol, polysiloxanes etc.

The backing material upon which the formulation is deposited can be a fabric, (woven, non-woven or fleeced), paper, plastic film or metal foil. Generally, the products made according to the present invention find their greatest utility in producing fine grinding materials and hence a very smooth surface is preferred. Thus finely calendered paper, plastic film or a fabric with a smooth surface coating is usually the preferred substrate for deposition of the composite formulations according to the invention.

The invention will be further described with respect to the following Examples which are understood to be for the purposes of illustration only and imply no necessary limitation on the scope of the invention.

EXAMPLE 1

In this Example the basic product was a commercial product sold commercially as NORaX U466 X110. This product is a coated abrasive with an engineered surface comprising a random trihelical pattern of raised composites comprised of P150 grit silicon carbide abrasive grain dispersed within a cured acrylate resin binder. The surface of the composites comprises a layer of a functional powder consisting of a blend of P150 silicon carbide abrasive grit and potassium fluoroborate applied and adhered prior to the cure of the acrylate resin. In the test described below this is referred to as simply "NORaX".

This basic product was compared with the product according to the invention in which the basic product was given a top size coat of a liquid one-step phenolic resin obtained from Oxychem under the designation Plyophen 43575. This was applied using a two roll coater device. The treated coated abrasive was cured over 12 hours at a temperature that was increased in linear fashion from 65.6° C. to 121° C. over ten hours and was maintained at the higher temperature for two hours. This is referred to hereafter as "Coated NORaX"

Both products were converted into 5 cm×335.5 cm belts and tested in a low speed, intermediate pressure, (2320 sfpm, 15 psi), grinding test with titanium as the workpiece ground. Grinding was performed for 30 minutes as a series of 5 second plunges. Stock removal was measured after every plunge for the first 150 seconds and thereafter every fifth plunge. Belt thickness was measured at three points along the belt using a micrometer to measure belt erosion. This was done after every plunge for the first 30 seconds and thereafter periodically, (every 50 to 100 seconds).

FIG. 1 shows the grinding results in terms of cut rate plotted against time. As will be observed, the NORaX belt had the best initial cut rate but the advantage vanished after about 15 minutes. The coated NORaX had the more constant cut rate.

The more important factor is however the pattern height variation as the grinding progresses. This parameter is followed in FIG. 2 from which it is apparent that both lost height rapidly during the first 50 seconds of grinding. Thereafter however the coated NORaX loses height much less rapidly. It is important to note that the NORaX product, in the first 5 seconds of grinding, loses about 20% of its original pattern height whereas in the coated NORaX product the corresponding loss of pattern height is only 1.5%. From this it is concluded that the main cause of the reduction is the loss of the functional powder layer from the surface rather than erosion of the shaped composite itself.

The above conclusion is reinforced by the data presented in FIG. 3 which compares the cumulative abrasive volume lost over time. The coated NORaX, over the length of the grinding tests, loses less than 20% of the volume lost by the NORaX belt.

EXAMPLE 2

In this Example the same basic coated abrasive with an engineered surface was used as was employed in Example 1. However the nature of the top size coat was varied. In the runs described in this Example four different top size coat formulations were used. In each case the binder was exactly the same as the binder used to construct the shaped abrasive composite structures but the formulations differed in the filler that was incorporated along with the binder. In each case the formulation was applied using the same two roll coater as was used in Example 1. The formulations used were as follows:

Sample 1 was sized with the acrylate resin alone;

Sample 2 included 20% by weight of wollastonite along with the resin;

Sample 3 was the same as Sample 2 with cryolite in place of wollastonite

Sample 4 had no top size coat at all.

Each sample was converted to a 4"×54" (10 cm×140 cm) belt and each was tested using a wet centerless grinder on 10" (25.4 cm) length by 1.5" (3.8 cm) OD cylinders made of 304 Stainless Steel. In-feed was incremented by 0.003" (0.0076 cm) from the original cylinder diameter for each pass; each pass consisted of 2 cylinders being sent through the grinder. The cumulative cut, (total amount of steel removed after the relevant number of passes), was followed and the results are presented on the graph attached as FIG. 4.

From this graph it can be seen that the cumulative cut was improved by as much as 25% over the same product without the top size coat. The belt wear experienced, (in terms of loss of belt thickness), was almost identical for all belts.

From the above data it is clear that the projectable life of the coated NORaX belt will be much greater than the NORaX belt and that, though the cut rates are somewhat similar after the initial grinding periods, the total amount of metal removable during the lifetime of the coated NORaX belt will be far greater.

We claim:

1. A coated abrasive having an abrasive surface which is engineered to comprise a plurality of shaped composites attached to a common backing material, said composites comprising cured resin with abrasive particles dispersed therein and a layer of particles of a functional powder applied over and adhered to the shaped abrasive composites characterized in that a top size coat overlies the functional powder particles.

2. A coated abrasive according to claim 1 in which the resin in the composites is selected from the group consisting of thermosetting resins and radiation curable resins.

3. A coated abrasive according to claim 1 in which the top size coat comprises a resin selected form the group consisting of thermosetting resins and radiation curable resins and combinations thereof.

4. A coated abrasive according to claim 3 in which the top size coat comprises a resin selected form the group consisting of phenolic resins, epoxy resins, acrylated oligomers of acrylated epoxy resins, acrylated urethanes, polyester acrylates, polymers comprising acrylated monomers and polyacrylated monomers and mixtures thereof.

5. A coated abrasive according to claim 1 in which the top size coat comprises a non-reactive thermoplastic binder resin component.

6. A coated abrasive according to claim 1 in which the shaped composites comprise particles of an abrasive selected from the group consisting of ceria, alumina, fused alumina/zirconia, silicon carbide, cubic boron nitride, diamond and mixtures thereof.

7. A coated abrasive according to claim 1 in which the top size coat comprises one or more additive selected from the group consisting of grinding aids, inert fillers, anti-static agents, lubricants, anti-loading agents and mixtures thereof.

8. A coated abrasive according to claim 1 in which the top size coat comprises fillers selected from the group consisting of calcium carbonate, sodium carbonate, quartz, glass beads, glass bubbles, talc, clays, calcium metasilicate, barium sulfate, calcium sulfate, aluminum sulfate, calcium oxide, aluminum oxide, aluminum trihydrate and mixtures thereof.

9. A coated abrasive according to claim 1 in which the top size coat comprises up to 50 wt % of a grinding aid.

10. A coated abrasive according to claim 9 in which the grinding aid is present in a weight percentage amount of from 10–30% and is selected from the group consisting of sodium cryolite, potassium tetrafluoroborate, chlorinated hydrocarbon waxes polyvinyl chloride and mixtures thereof.

* * * * *